United States Patent [19]

Oetiker

[11] Patent Number: 5,195,788
[45] Date of Patent: Mar. 23, 1993

[54] INSERT MEMBER FOR USE WITH HOSE CLAMP ARRANGEMENTS

[76] Inventor: Hans Oetiker, Oberdorfstrasse 21, CH-8812, Horgen, Switzerland

[21] Appl. No.: 660,122

[22] Filed: Feb. 22, 1991

Related U.S. Application Data

[63] Continuation-in-part of Ser. No. 472,280, Jan. 30, 1990, Pat. No. 5,031,301.

[51] Int. Cl.$^5$ .............................................. F16L 33/207
[52] U.S. Cl. ..................................... 285/252; 285/381; 29/516
[58] Field of Search ............... 285/242, 243, 252, 253, 285/256, 381; 29/516, 421.1

[56] References Cited

U.S. PATENT DOCUMENTS

| | | | |
|---|---|---|---|
| 1,594,997 | 8/1926 | Bulley | 29/516 X |
| 1,887,877 | 11/1932 | Shaffer | 285/253 |
| 3,142,881 | 8/1964 | Johnston | 285/253 X |
| 3,303,669 | 2/1967 | Oetiker | 285/252 X |
| 3,463,517 | 8/1969 | Courtot et al. | 285/253 X |
| 3,574,355 | 4/1971 | Oetiker | 285/243 X |
| 4,453,746 | 6/1984 | Keenan | 285/253 X |
| 4,635,973 | 1/1987 | Sauer | 285/242 |
| 4,872,713 | 10/1989 | Kapgan | 285/381 |

FOREIGN PATENT DOCUMENTS 73048 3/1983 European Pat. Off. ............ 285/242

*Primary Examiner*—Dave W. Arola
*Attorney, Agent, or Firm*—Paul M. Craig, Jr.

[57] ABSTRACT

An insert member for use in a hose connection which is of asymmetric construction and is outwardly flared at one end and inwardly bent at the other to be able to be located precisely in relation to a collar or shoulder on a nipple onto which a hose is to be securely fastened. One or several circumferential inwardly pressed grooves are provided in the main surface portion of the insert member. The bridging portion of the insert member which extends over the collar has thereby a somewhat larger outside dimension and is connected with the main surface portion of the insert member by way of an inclined step.

32 Claims, 3 Drawing Sheets

INSERT MEMBER FOR USE WITH HOSE CLAMP ARRANGEMENTS

BACKGROUND INFORMATION

This application is a continuation-in-part application of my copending application Ser. No 07/472,289 entitled "High Pressure Coupling and Apparatus for Installing Same", filed in the U.S. Patent and Trademark Office on Jan. 30, 1990 now U.S. Pat. No. 5,031,301, Jul. 16, 1991.

FIELD OF INVENTION

The present invention relates to an improved insert member for fastening a hose onto a nipple by means of a clamp and more particularly to an improved insert member which assures automatic correct positioning of the various components and improved protection of the hose against damage coupled with very good holding ability of the clamp arrangement.

BACKGROUND OF THE INVENTION

Insert members for use with hose clamps are known as such in the prior art. My prior U.S Pat. No. 3,303,669 describes an insert member in the form of an open metallic ring which is provided with a central circumferentially extending bead to increase the specific pressure against the hose and therewith assure good sealing The insert member thereby consists of a flat band which includes an inwardly directed pressed-in bead in the center area and whose ends overlap underneath the clamp. To improve the guidance of the clamp which may be, for example, of the type described in any of my prior U.S. Pat. Nos. 2,614,304; 3,082,489 and 3,286,314, the edges of the metallic band from which the insert member is made may also be bent outwardly.

An insert member of only limited circumferential extent, which is disclosed in my prior U.S. Pat. No. 3,789,463, is of sufficient length to bridge the gap underneath the ear of a clamp, for example, as described in my aforementioned prior U.S. Patent or U.S. Patents, to mention a few of the clamps utilizing so-called "Oetiker" ears. The insert member of my prior U.S. Pat. No. 3,789,463 is provided with a relatively short circumferential groove intended to strengthen the insert member against buckling so as to permit use of a thin band material for this insert member.

Various insert members are also disclosed in my prior U.S. Pat. No. 4,312,101 which are intended to prevent leakages within the area underneath the ear even with the use of relatively thin band material of the insert member. In one embodiment of an insert member according to this patent, an outwardly protruding embossment generally in the circumferential direction is provided which is intended to fit underneath the ear and is so constructed and arranged that the legs of a typical "Oetiker" ear will ride up along the surfaces of the embossment during contraction of the ear to thereby increase the holding ability. According to another embodiment of this patent, the ring-like member is provided at one end with two leg portions defining therebetween an elongated opening into which a tongue portion at the other end of the insert member is intended to slide during contraction of the ear in order to maintain a practically perfect circular configuration during tightening. Still other embodiments of this patent disclose insert rings made, not from thin band material, but from wire-like material of solid cross section.

While the insert members disclosed in my aforementioned prior patents proved quite successful in connection with their intended functions, they provided no automatic positioning of the various components independently of the clamping ring. Outwardly bent edges of the insert member described in my aforementioned patents performed a guide function for the clamping ring. By the same token, they determined the relative positions between the clamping ring and the insert member without any influence on their position relative to the nipple and hose mounted thereon and the holding ability of the overall arrangement.

SUMMARY OF THE INVENTION

It is a primary object of the present invention to provide an insert member which assures accurate positioning of the insert member relative to the nipple onto which the hose is to be fastened and of the ring-like clamping member relative to the insert member and at the same time improves holding ability of the hose on the nipple and hose protection against damage.

According to another feature of the present invention, the insert member is so constructed that it can be inserted only in one direction which also assures protection of the hose against cuts by the presence of outwardly flaring edges of the insert member at one end thereof. The opposite end of the insert member is bent inwardly in such a manner that the opening formed thereby has an inner diametric dimension smaller than the outer diametric dimension of an outwardly extending projection on the nipple, formed, for example, by a flange, shoulder or collar so as to positionally limit movement of the insert member in the installing direction when the inwardly bent end abuts at the collar, shoulder or flange. Furthermore, the inwardly bent edge of the insert member can never come into contact with the hose to damage the same because it terminates on the side of the collar, shoulder or flange opposite to its side where the end of the hose is located.

The underlying problems are solved according to this invention in that, contrary to the prior art insert members, the insert member according to the present invention is constructed asymmetrically, i.e., has one lateral edge bent or flared outwardly while the opposite end is bent inwardly at a more or less right angle. As a result thereof, not only hose damage by the insert member is effectively prevented, but also incorrect assembly is impossible. Furthermore, by providing the insert member with an inwardly pressed-out circumferentially directed groove, the groove in conjunction with the inwardly bent end of the insert member will securely position and hold the insert member as well as the hose in proper position over the nipple once the clamping ring is tightened thereby also increasing the holding ability of the clamp arrangement.

Additionally, the outer surface of the insert ring has a section of greater diametric dimension within an area adjacent the inwardly bent edge than the remaining outer surface intermediate this section and the outwardly bent end so that the clamping ring, during contraction, will cause the inwardly bent end to further extend radially inwardly to prevent with certainty displacement over the nipple shoulder or collar, and will do so before the forces exerted radially inwardly during final contraction of the clamping ring will cause the insert member and more particularly the inwardly directed groove to press the hose securely onto the nipple. If, on the other hand, the clamping ring has a width no greater than the remaining outer surface of the insert member, this section together with the outwardly bent end will assure proper positioning of the clamping ring relative to the insert member and the nipple-hose assembly.

According to still another feature of the present invention, the insert member according to the present invention can also be used to advantage in connection with high pressure hose connections by eliminating costly manufacturing operations of the external sleeve-like member which is contracted, preferably after internal expansion of the nipple as disclosed in my copending application Ser. No. 07/472,280, entitled "High Pressure Coupling and Apparatus for Installing Same", filed in the U.S. Patent and Trademark Office on Jan. 30, 1990. By utilizing an insert member in accordance with the present invention, a high-pressure hose connection can be achieved capable of withholding very high pressures, yet permitting the use of a sleeve-like clamping member with uniform internal dimensions such as a member made from tubular stock which, during final fastening of the hose connection, has its internal diametric dimensions reduced by shrinking, crimping or any other known means.

The use of an insert ring in accordance with the present invention also obviates the need for any special measures to prevent damage of the hose as a result of sharp edges of the external sleeve-like member, such as machining operations, because the outwardly flared end of the insert member covers the free end of the external clamping member on the side opposite the free end of the hose. At the opposite end, contact between the external clamping member and the hose is precluded by the end portion of the insert member which extends over the nipple collar or shoulder and which terminates in the inwardly bent end on the other side of the nipple collar or shoulder.

The insert ring according to the present invention may be provided with one or several circumferential inwardly pressed-out grooves that serve not only to hold the hose in position but to accurately locate the same on the nipple by cooperation with preferably rounded-off annular beads on the hose-receiving nipple portion which are arranged correspondingly along the outer surface of the nipple portion.

A very high pressure hose connection is attainable with the insert in accordance with the present invention if, as disclosed in my aforementioned copending patent application, the nipple is first expanded radially outwardly with subsequent contraction of the external ring-like clamping member which with the present invention can be in the form of a simple sleeve-like member of tubular stock that is shrunk, crimped or contracted by any other known means over the internally expanded nipple portion, supporting thereon the hose with insert member.

According to still another feature of the present invention, the diametric dimension of the nipple shoulder or collar is somewhat smaller than the normal outside diameter of the hose and the insert member is so constructed that the surface extending over the shoulder or collar of the nipple has a section of somewhat greater internal diametric dimension than the external diameter of the nipple collar or shoulder and an external diametric dimension somewhat greater than the external diametric dimension of the remaining central portion of the insert member which is provided with the reinforcing groove(s). As a result thereof, contraction of the ring-like clamping member will first depress radially inwardly the section of the insert member overlying the nipple shoulder or collar until its external diametric dimension corresponds to the external diametric dimension of the remaining central portion of the insert member whereupon continued contraction of the ring-like clamping member will exert uniform radially inwardly directed pressure on the entire external surface of the insert member with which the ring-like clamping member is in contact. This assures secure positioning of the various components of the hose connection.

If the insert member according to the present invention is used in a high pressure hose connection in which the nipple portion is initially expanded internally before the ring-like clamping member, then contact of the ring-like clamping member with the surface of the section of the insert member overlying the nipple shoulder or collar, which thereby has an external diametric dimension at least close to the internal diametric dimension of the ring-like clamping member, will effectively prevent external expansion of the insert member during expansion of the nipple portion. In the alternative, the ring-like clamping member may be partially contracted initially before the nipple portion is expanded, to a point where the ring-like clamping member prevents expansion of the insert member.

The insert member according to the present invention may have a circumferential length somewhat less than the circumference of the hose which is to be fastened onto the nipple. With normal rubber-like hose material, a small gap in the circumferential direction of the insert ring is normally not fatal. With harder, relatively thin plastic hose materials, however, a gap should be avoided to the extent possible. This can be done by a slight overlap in the circumferential direction between the inner and outer ends of the insert member, particularly if the band material from which the insert member is made is relatively much thinner than the thickness of the ring-like clamping member. However, as the small step which is then formed at the end of the overlapped inner band portion may still be of significance, the insert member in accordance with another feature of this invention may also be so constructed as to assure a gap-free stepless internal clamping surface.

BRIEF DESCRIPTION OF THE DRAWINGS

These and other objects, features and advantages of the present invention will become more apparent from the following description when taken in connection with the accompanying drawing which shows, for purposes of illustration only, several embodiments in accordance with the present invention, and wherein.

DETAILED DESCRIPTION OF THE DRAWING

Figure 1:
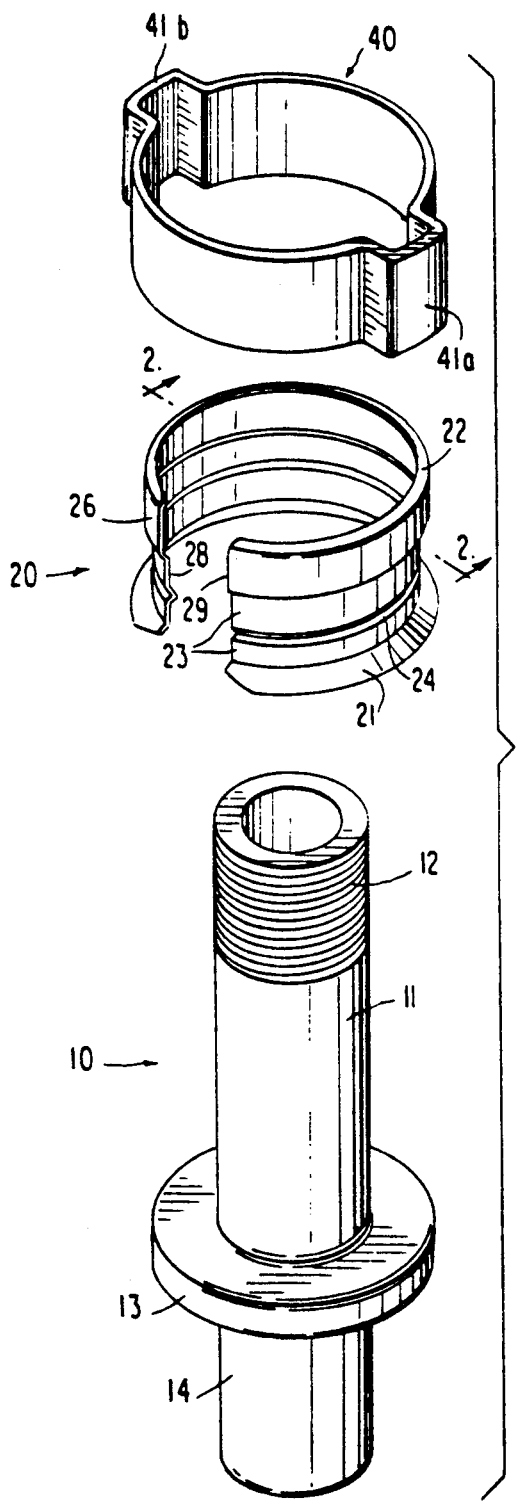
FIG. 1 is an exploded view of a hose connection utilizing an insert member in accordance with the present invention.
Figure 2:
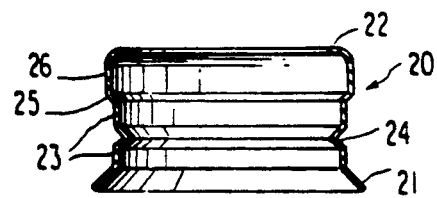
FIG. 2 is a cross-sectional view taken along line 2—2 of FIG. 1 and showing the cross-sectional configuration of the insert member in accordance with the present invention.
Figure 3:
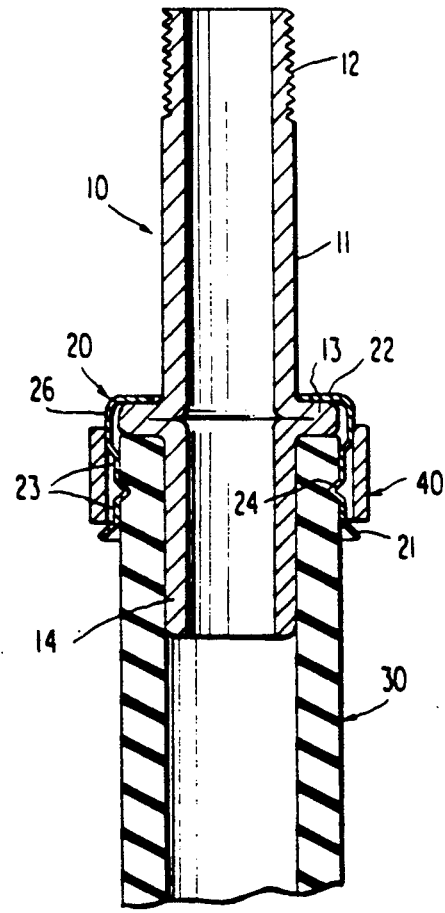
FIG. 3 is a longitudinal axial cross-sectional view of the assembled hose connection shown in FIG. 1 just prior to the final contraction of the ring-like clamping member

Referring now to the drawing wherein like reference numerals are used throughout the various views to designate like parts, and more particularly to FIGS. 1 to 3, reference numeral 10 generally designates therein a nipple which may be of any known construction and includes a connecting portion 11 provided, for example, with a threaded surface 12, a collar or shoulder 13 realized in any known manner, for example, by internal expansion, and a nipple portion 14, properly speaking, onto which the hose 30 is to be fastened.

Figure 4:
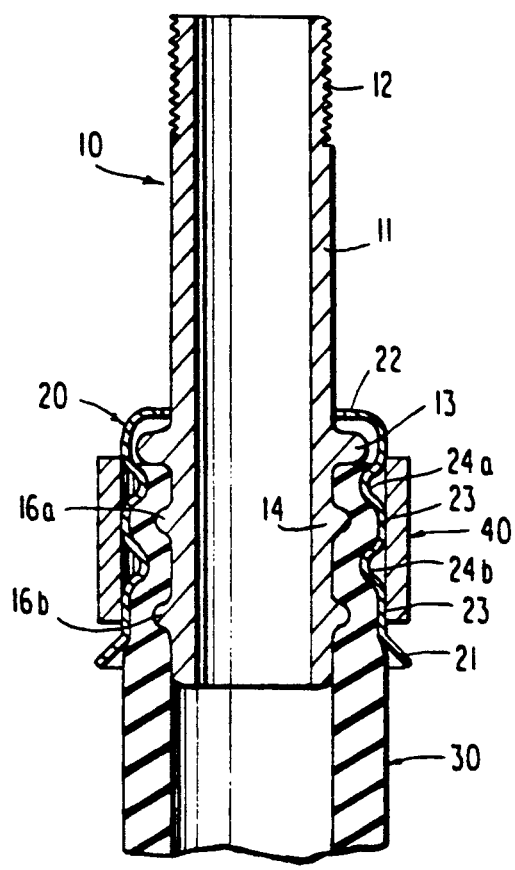
FIG. 4 is a longitudinal axial cross-sectional view, similar to FIG. 3, illustrating the final assembled position of a hose connection of the type shown in FIG. 1, but provided with a modified nipple having annular beads along the nipple portion.

The insert member 20 in the illustrated embodiment is an open insert member which is of asymmetric construction, i.e., includes an outwardly flared end portion 21 at one end and an inwardly bent flange portion 22 at the other end. Intermediate these two end portions, the insert member has a main surface 23 provided with at least one circumferentially extending inwardly pressed-out groove 24 for assisting in anchoring and holding the hose onto the nipple portion 14. The main surface 23 of the insert member passes over into a bridging portion 26 extending externally over the shoulder or collar 13 by way of an inclined step portion 25. The external diametric dimension of the bridging portion 26 is thereby somewhat greater than the external diametric dimension of the main surface 23 of the insert member 20 and its internal diametric dimension provides a spacing from the outer surface of the collar or shoulder 13 sufficient to permit compression of the hose 30 by the insert member 20 when the ring-like clamping member generally designated by reference numeral 40 is contracted. For that reason, the collar or shoulder should have an outer diametric dimension somewhat smaller than the normal outer diametric dimension of the hose 30. As a result thereof, the ring-like clamping member 40, which may be, for example, a clamp structure with two so-called "Oetiker" ears of the type described in my prior U.S. Pat. No. 2,614,304, will initially come into contact with its internal surface with the external surface of the bridging portion 26, and will start to depress the same until also compressing the main surface portion, i.e., until the step portion 25 and the bridging portion 26 are substantially in the plane of the main surface portion 23 whereupon further contraction of the clamping member 40 will cause the then substantially coplanar surfaces 23, 26 and 25 of the insert member 20 to exert radially inwardly directed pressure on the hose 30 and will thereby also cause the groove(s) 24 to press further into the hose 30 The final installed position of the hose connection in accordance with the present invention is shown in FIG. 4 in which, however, the insert member 20 is provided with two circumferentially extending grooves 24a and 24b cooperating with two preferably rounded-off annular beads 16a and 16b provided on the nipple portion 14 and with collar 13 to positionally locate the insert member 20 in relation to the nipple 10. Of course, the presence of only one groove 24 in cooperation with the inwardly bent end portion 22 will provide a similar positional location with respect to the collar or shoulder 13 of the nipple 10.

The hose connection in accordance with the present invention is installed as follows:

The hose 30 is initially placed over the nipple portion 14 whereupon the insert ring 20 is slipped over the connecting portion 11 with the flaring end portion 21 first until the inwardly bent end portion 22 abuts at or at least comes into a position adjacent the collar 13 of the nipple structure 10. The clamping ring 40 is then slipped over the preassembled nipple 10, hose 30 and insert ring 20 from the end of the connecting portion 11 of the nipple 10 until it is in a position as shown in FIG. 3. As the "Oetiker" ear 41a is started to be contracted, the parts are initially in the position illustrated in FIG. 3. Further contraction of the ear 41a and subsequent contraction of the ear 41b will find the parts in their position as shown in FIG. 4. However, in lieu of a two-ear clamp, also a one-ear clamp or a multi-ear clamp may be used to fasten the hose together with the insert member on the nipple Furthermore, any other clamp may be used as also a ring-like member which is shrunk over the insert member. Furthermore, two or more axially spaced clamping rings may be used It is also possible to make the clamping ring narrower so that it will come to lie between flared end 21 and step 25

The hose connection in accordance with the present invention offers a number of advantages. It is simple to install, permits use of an insert member of relatively thin band material that can be readily manufactured at relatively low cost, assures proper positioning of the various parts in relation to one another and by reason of the interaction between the circumferential groove 24 and the inwardly bent end portion 22 assures proper positioning not only of the insert member in relation to the collar 13 but also of the clamping ring 40 which is stopped by the flared end portion 21. A secure positioning and connection of the hose 30 in relation to the collar 13, i.e., in relation to the nipple structure 10 is achieved thereby. Axial movement of the insert member 20 is thus prevented during assembly and in the assembled condition which in turn minimizes the danger of axial movement of the hose once the connection is completed.

The presence of two or more annular beads 16a and 16b on the nipple portion 14 in conjunction with a corresponding number of circumferential grooves 24a and 24b in the insert ring further increases the holding ability of the hose connection in accordance with the present invention, especially if each annular groove in the insert member is so positioned that it comes to lie between two beads or a bead and the collar 13.

In lieu of a two-ear clamp structure 40 as shown in the drawing, it is of course understood that any other clamp structure can be used which provides sufficient compressing forces to assure the requisite holding ability of the hose connection.

Figure 5:
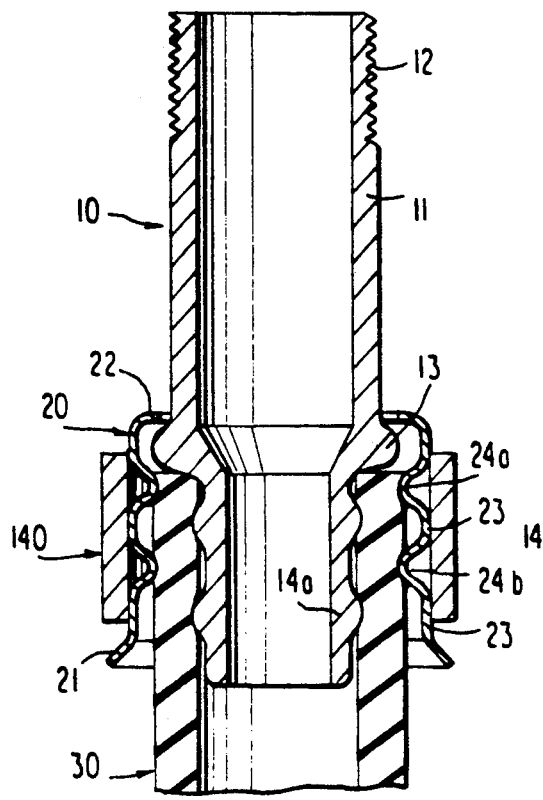
FIG. 5 is a longitudinal axial cross-sectional view, similar to FIG. 4, but illustrating a high pressure connection with an insert member in accordance with the present invention with the parts in the assembled position before internal expansion of the nipple portion.
Figure 6:
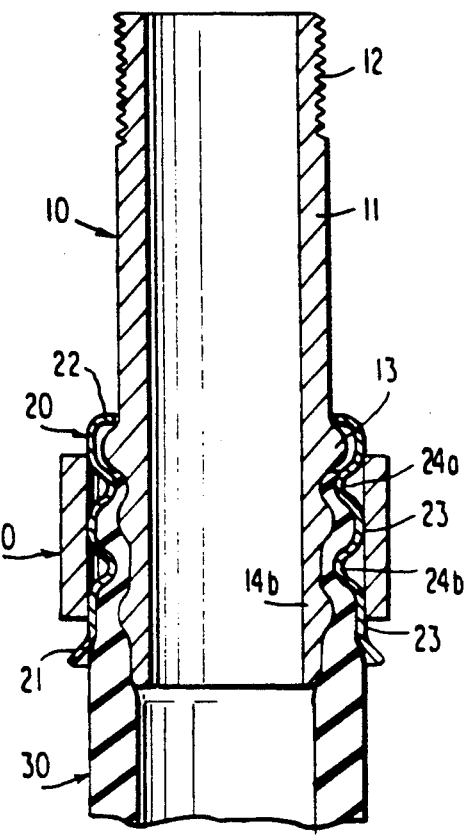
FIG. 6 is a longitudinal axial cross-sectional view, similar to FIG. 5, with the parts in the final installed position after internal expansion of the nipple portion and subsequent contraction of the ring-like clamping member.

A high pressure hose connection can be realized with the use of the insert ring in accordance with the present invention by initial internal expansion of the nipple portion as described in my aforementioned application. FIG. 5, in which the same reference numerals as in FIG. 4 are used to designate corresponding parts, illustrates a nipple portion 14a prior to its internal expansion, while FIG. 6 shows the nipple portion 14b after it has been internally expanded from its original shape 14a of FIG. 5. The ring-like clamping member 140 which is shown in FIG. 6 in its final contracted condition, may thereby be a short sleeve-like ring member made from tubular stock which is contracted by any known means, preferably is shrunk over the insert member 20. As explained in my copending application, this particular arrangement offers an extraordinarily high pressure hose connection with a number of additional advantages such as simplicity of structure and installation coupled with extraordinary high pressure holding ability. Moreover, for reasons explained above, it is also preferable to coordinate the external diametric dimension of the bridging portion 26 with the internal diametric dimension of the clamping member 140 so that the former is only slightly smaller than the latter.

Figure 7:
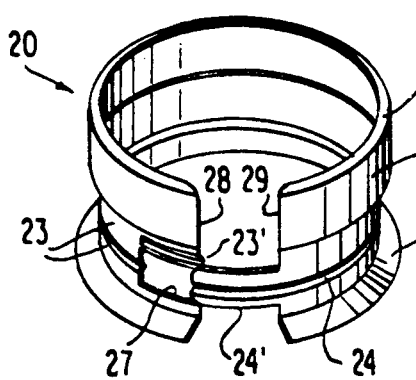
FIG. 7 is a perspective view of a modified embodiment of an insert member in accordance with the present invention in which a substantially gap-free stepless internal clamping surface is achieved over the entire circumference of the insert member.
Figure 8:
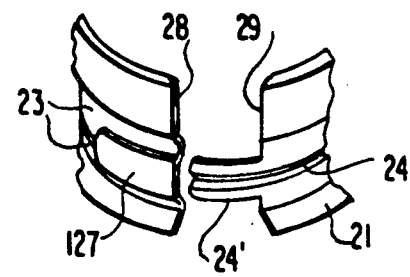
FIG. 8 is a partial perspective view, similar to FIG. 7, illustrating a still further modified embodiment of an insert member in accordance with the present invention in which a substantially gap-free, stepless internal clamping surface is achieved over the entire circumference of the insert member.

The insert ring as used in FIGS. 1-5 is thereby of such circumferential length that a small gap exists between its end surfaces 28 and 29. By appropriate dimensioning of the circumferential length of the insert member 20, this gap can be kept relatively small. However, it is also within the purview of the present invention to construct the insert member so as to overlap as shown, for example, in my prior U.S. Pat. No. 3,303,669. The step formed by the overlap can thereby be made relatively small if thin band material is used for the insert member 20. Furthermore, by providing one end of the insert member with a tongue-like extension 24' containing the circumferential groove(s) 24 which is adapted to engage into an opening 27 formed by a fork-like arrangement at the other end of the insert member, somewhat similar to FIG. 9 of my prior U.S. Pat. No. 4,312,101, a gap-free insert member arrangement providing a substantially uniform radial pressure on the hose can be attained. FIG. 7 illustrates how this is achieved with an insert ring according to this invention in which a tongue-like extension 24' is adapted to engage in the opening 27 formed by the fork-like configuration in the other band end. The remaining main surface portion 23 of the insert member on both sides of the opening 27 may also be provided with inwardly extending rib-like portions 23' to assure substantially constant radially inwardly directed pressure. Moreover, an internal configuration of the insert member devoid of any steps or discontinuities can also be realized by applying the teachings of my prior U.S. Pat. No. 4,299,012 to the insert ring by the provision of a tongue-like extension 24' at one end of the insert member in conjunction with a tongue-receiving channel 127 beginning within the area of a step as shown in FIG. 8.

Additionally, it is of course also possible to first mount the insert member over the nipple structure until the inwardly bent end comes into abutment at the collar and thereafter mounting the hose over the nipple within the space between the thus-preassembled insert member and nipple portion.

While I have shown and described only several embodiments in accordance with the present invention, it is to be understood that the same is not limited thereto but is susceptible of numerous changes and modifications as known to those skilled in the art. For example, the clamp structure of FIGS. 1-3 may utilize also any other clamp structure or clamping ring that satisfies the force requirements of this arrangement. Similarly, in the embodiment of FIGS. 5 and 6, the clamping ring may be contracted by any known means such as crimping or magnetic shrinking as used with copper rings as long as the requisite forces are attainable to assure good holding ability of the hose connection.

I therefore do not wish to be limited to the details shown and described herein, but intend to cover all such changes and modifications as are encompassed by the scope of the appended claims.

I claim:

1. An insert member for use in a hose connection to securely fasten a hose onto a nipple provided with an external collar portion integral with the nipple, characterized in that the insert member is of open ring-shape in the circumferential direction constructed asymmetrically with one end thereof bent outwardly and the other end bent inwardly leaving therebetween a main surface portion extending substantially uninterruptedly over its circumferential length, and at least one inwardly extending groove means in said main surface portion of the insert member to assist anchoring of the hose whereby said outwardly and inwardly bent ends at the same time assure proper positioning of the various parts during assembly of the hose connection, said insert member having an internal diametric dimension greater than the diametric dimension of the collar portion so that it can be mounted over the nipple with the one end first, and said groove means extending over substantially the entire uninterrupted circumference of the main surface portion.

2. An insert member according to claim 1, characterized in that a bridging portion of slightly larger external diameter is provided between the main surface portion and the inwardly bent end which is adapted to extend over the collar portion of the nipple, said bridging portion having an axial length smaller than the axial length of the main surface portion.

3. An insert member according to claim 2, wherein the axial length of said bridging portion is only slightly greater than the axial length of the collar portion.

4. An insert member according to claim 2, wherein said one end is bent out so as to form a flaring open end.

5. An insert member according to claim 2, characterized in that an inclined step connects the main surface portion with the bridging portion.

6. A hose connection between a hose and a nipple, which comprises an insert member according to claim 5, wherein the nipple includes a nipple portion, the hose is placed over the nipple portion in substantial abutment at the collar portion, the insert member surrounds the hose in such a manner that the inwardly bent end substantially abuts at the collar portion on the side opposite the abutment of the hose, and ring-like clamping means extending over said insert member which in the installed condition exerts a radially inwardly directed pressure on the insert member in such a manner that the groove means are securely pressed into the hose so as to securely anchor the hose in position between said collar and said groove means.

7. An insert member according to claim 5, wherein said insert member has a length in the circumferential direction smaller than the circumferential length of the hose over which it is to be placed.

8. An open insert member of finite length according to claim 5, characterized in that the circumferential length of the insert member is such that in its installed condition the end surfaces overlap.

9. An open insert member of finite length according to claim 5, characterized in that the ends of the insert member are provided with means to assure a substantially gap-free stepless internal surface of the insert ring in the installed condition.

10. An insert member according to claim 9, characterized in that the last-mentioned means includes a tongue-like extension at one end of the insert member within the area of the groove means, and tongue-receiving means at the other end of the insert member.

11. An insert member according to claim 10, wherein the tongue-receiving means is in the form of a fork-shaped end portion at the other end of the insert member forming a tongue-receiving opening.

12. An insert member according to claim 10, characterized in that said tongue-receiving means includes a centrally located channel for receiving the tongue-like extension which commences at a first step-like portion.

13. An open insert member of finite length according to claim 1, characterized in that the ends of the insert member are provided with means to assure a substantially gap-free stepless internal surface of the insert ring in the installed condition.

14. An insert member according to claim 13, characterized in that the last-mentioned means includes a tongue-like extension at one end of the insert member within the area of the groove means, and tongue-receiving means at the other end of the insert member.

15. An insert member according to claim 11, wherein the tongue-receiving means is in the form of a fork-shaped end portion at the other end of the insert member forming a tongue-receiving opening.

16. An insert member according to claim 14, characterized in that said tongue-receiving means includes a centrally located channel for receiving the tongue-like extension which commences at a first step-like portion.

17. A hose connection between a hose and a nipple, which comprises an insert member according to claim 1, wherein the nipple includes a nipple portion, the hose is placed over the nipple portion in substantial abutment at the collar portion, the insert member surrounds the hose in such a manner that the inwardly bent end substantially abuts at the collar portion on the side opposite the abutment of the hose, and ring-like clamping means extending over said insert member which in the installed condition exerts a radially inwardly directed pressure on the insert member in such a manner that the groove means are securely pressed into the hose so as to securely anchor the hose in position between said collar and said groove means.

18. A hose connection according to claim 17, wherein said nipple portion is provided with external annular bead means and at least one groove means is located between two annular bead means.

19. A hose connection according to claim 17, wherein one annular groove means is located between an annular bead means on the nipple portion and the collar portion.

20. A hose connection according to claim 17, wherein said ring-like clamping means is a clamp structure including at least one plastically deformable ear means.

21. A hose connection according to claim 17, wherein said ring-like clamping means is a clamping ring adapted to be shrunk over the insert member.

22. A hose connection according to claim 21, wherein said clamping ring is of sleeve-like construction having substantially constant internal dimensions over its axial length.

23. A method for fastening a hose onto a nipple structure having a nipple portion and a collar portion, comprising the steps of inserting the hose over the nipple portion from one end of the nipple structure, inserting over the nipple structure from the other end thereof an asymmetrical insert member which has an inwardly bent end portion at one end and an outwardly bent end portion at the other end, until its inwardly bent end is in the area of the collar portion on the side thereof opposite the hose, thereafter mounting a ring-like clamping member over the thus-assembled nipple structure, hose and insert member from the other end of the nipple structure until it comes to lie with its leading edge in the area of the beginning of the outwardly bent end portion of the insert member, and thereafter contracting the ring-like clamping member to exert radially inwardly directed pressure on the hose by way of the insert member.

24. A method according to claim 23, wherein said ring-like clamping member is slipped over said insert member until its leading edge is stopped by the outwardly bent end portion.

25. A method according to claim 24, wherein the nipple portion is initially internally expanded before the ring-like clamping member is completely contracted 26. A method according to claim 25, wherein the insert member has a main surface portion and a bridging portion between the main surface portion and the inwardly bent end portion which is of slightly larger external diametric dimension than the main surface portion, wherein contraction of the ring-like clamping member initially causes the bridging portion to decrease in diametric dimension until it approaches the diametric dimension of the main surface portion whereupon the main surface portion is contracted by continuing contraction of the ring-like clamping member.

27. A method according to claim 23, in which the insert member has at least one circumferentially extending inwardly pressed-out groove which is pressed into the hose upon contraction of the ring-like clamping member.

28. A method according to claim 27, wherein the nipple portion has at least two annular beads with one inwardly extending groove located in an area opposite two annular beads before the ring-like clamping member is contracted.

29. A method according to claim 28, further comprising the steps of initially expanding the nipple portion to a diametric dimension corresponding substantially to the inner diameter of a nipple-connecting portion located on the other side of the collar portion and only thereafter contracting the ring-like clamping member.

30. A method according to claim 23, wherein the ring-like clamping member is contracted by plastic deformation of an ear in the clamping member.

31. A method according to claim 23, wherein the ring-like clamping member is contracted by shrinking the same over the insert member.

32. A method according to claim 23, wherein the insert member has a main surface portion and a bridging portion between the main surface portion and the inwardly bent end portion which is of slightly larger external diametric dimension than the main surface portion, wherein contraction of the ring-like clamping member initially causes the bridging portion to decrease in diametric dimension until it approaches the diametric dimension of the main surface portion whereupon the main surface portion together with the bridging portion are contracted by continuing contraction of the ring-like clamping member.

* * * * *